United States Patent [19]

Meiring

[11] Patent Number: 4,611,676

[45] Date of Patent: Sep. 16, 1986

[54] WEIGHBELT APPARATUS

[75] Inventor: Willem J. Meiring, Stellenbosch, South Africa

[73] Assignee: Tobacco Research and Development Institute Limited, Zug, Switzerland

[21] Appl. No.: 750,544

[22] Filed: Jul. 1, 1985

[51] Int. Cl.⁴ ............... G01G 19/52; G01G 19/00; G01L 25/00

[52] U.S. Cl. ................................ 177/50; 177/145; 73/1 B

[58] Field of Search ............... 177/50, 145, 211; 73/1 B

[56] References Cited

U.S. PATENT DOCUMENTS

| | | | |
|---|---|---|---|
| 3,439,761 | 4/1969 | Laimins | 177/211 |
| 3,477,532 | 11/1969 | Wilder | 177/211 |
| 3,656,337 | 4/1972 | McDonald | 177/50 X |
| 3,850,023 | 11/1974 | McDonald | 73/1 B |
| 3,976,150 | 8/1976 | Wilson et al. | 73/1 B X |
| 4,353,427 | 10/1982 | Stock et al. | 177/50 |
| 4,509,609 | 4/1985 | Meiring | 177/50 X |

Primary Examiner—George H. Miller, Jr.
Attorney, Agent, or Firm—Scully, Scott, Murphy & Presser

[57] ABSTRACT

Weighbelt apparatus of the kind described in U.S. Pat. No. 4,509,609 is improved by having the planar support cantilevered to both sides of a central transverse crossbeam which rests on six cantilever arms carrying strain gauges in cutouts. Two calibrating weights can be hung independently off the bottom of the beam when the belt is lifted off the planar support. This configuration avoids spurious reading when the load on the belt is unevenly distributed.

3 Claims, 3 Drawing Figures

WEIGHBELT APPARATUS

BACKGROUND TO THE INVENTION

This invention relates to weighbelt apparatus.

In process control, where accurate flow of material is required, weighing units are used to measure the mass of material transported. Flow control is obtained by either varying the flow speed of the material or the thickness of the layer of material transported over the weighing device. For effective control the weighing device must measure the mass of the material with a considerable degree of accuracy.

In U.S. Pat. No. 4,509,609 a weighbelt apparatus which gives very accurate results has already been proposed. This apparatus has a belt upon which material is moved across the apparatus, a generally planar support for the belt extending across the apparatus, belt lifting means connected to the apparatus and arranged to lift the belt out of contact with the planar support during operation of the apparatus, and means arranged to apply a known downward force to the planar support in order to calibrate the apparatus. The calibration procedure is fully described in the U.S. patent.

In this apparatus it has been found that spurious effects can arise due to uneven loading or uneven lateral distribution of the load on the belt over the planar support.

SUMMARY OF THE INVENTION

It is an object of the invention to provide apparatus which is less sensitive to uneven load distribution.

According to the invention the known apparatus is improved in that the planar support is cantilevered to each side of a central crossbeam transverse to the direction of belt movement, the crossbeam is mounted on a plurality of cantilever arms cantilevered off a fixed structure, strain gauges are mounted on the arms and the means to apply the known downward force acts on the lower end of the crossbeam in the vertical plane containing the longitudinal axis of the crossbeam.

The invention further provides that the cantilever arms are formed with cutouts and that the strain gauges are positioned in the cutouts.

In the preferred form of the invention two known downward forces can be applied to the lower end of the crossbeam.

DESCRIPTION OF AN EMBODIMENT

Figure 1:
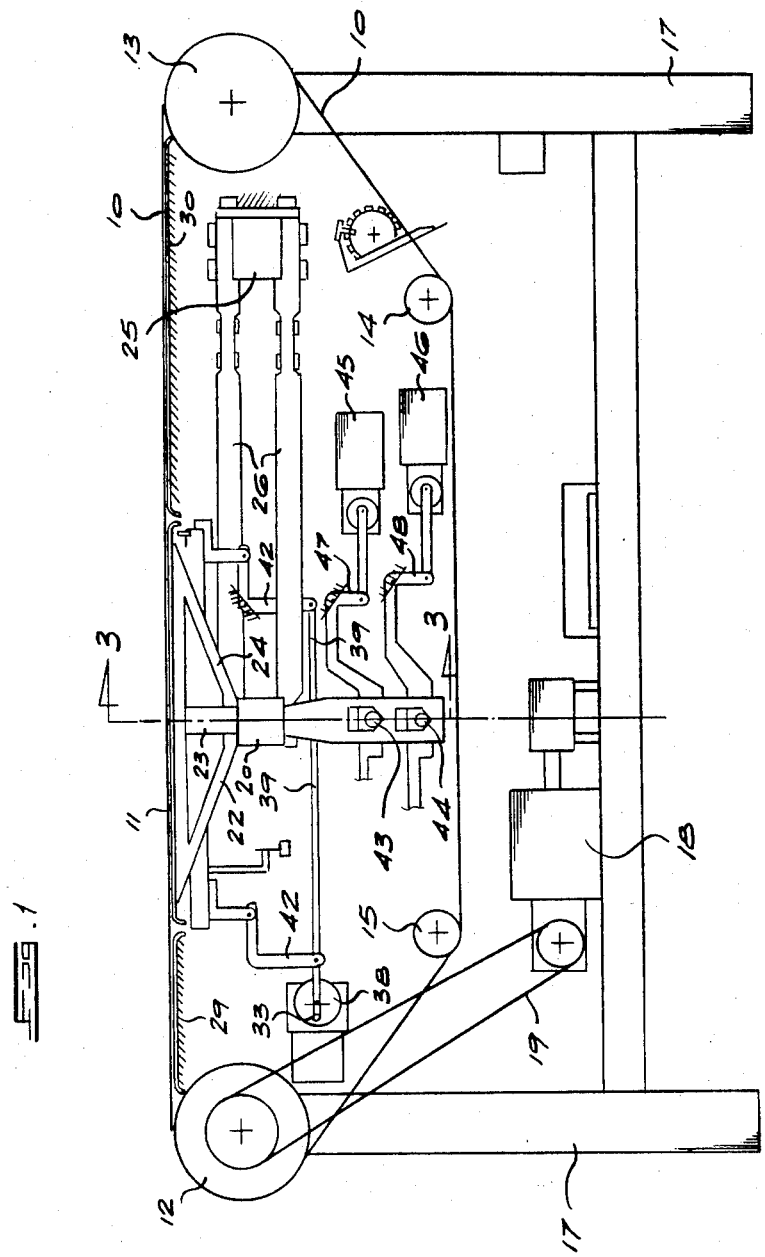
FIG. 1 is a somewhat diagrammatic section through an apparatus according to the invention.
Figure 2:
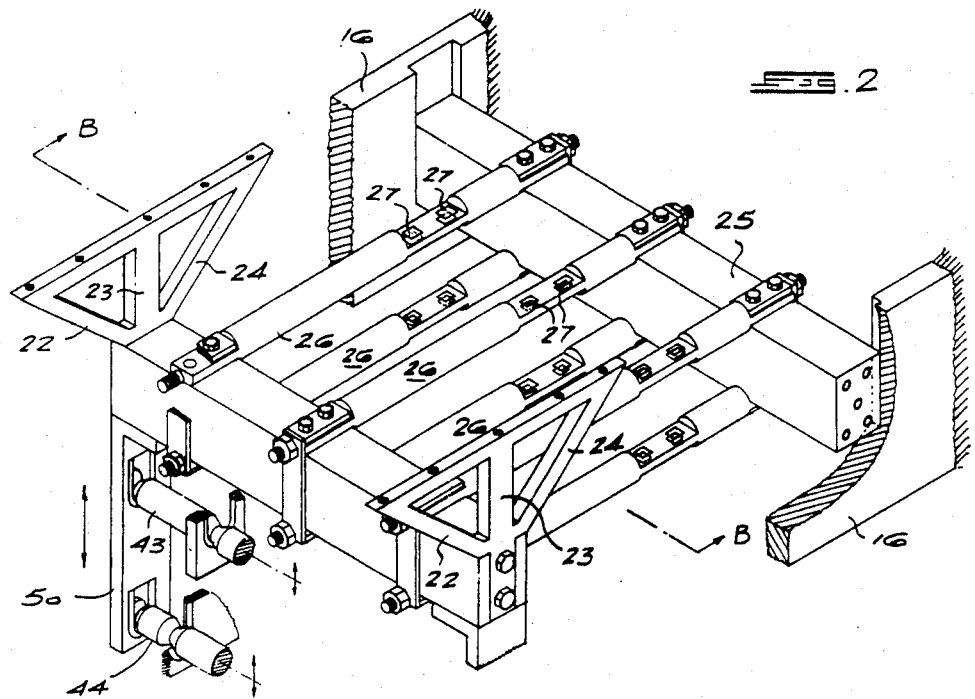
FIG. 2 is a fragmentary perspective view with parts broken away of part of the apparatus of FIG. 1.

FIG. 1 shows an endless conveyor belt 10 carried by a drive roller 12 and idler rollers 13, 14 and 15 mounted to side plates 16. One idler roller 13 is adjustable to facilitate adjustment of belt alignment and belt tension. The side plates 16 are supported on legs 17. The drive roller 12 is driven by a drive motor 18 through a chain 19.

A planar support 11 is cantilevered by means of supports 22 and 24 to a crossbeam 20 and supported on that beam by a support 23. The crossbeam 20 is transverse to the direction of travel of the belt 10. The crossbeam 20 in turn is mounted on six parallel cantilever arms 26 carried by a beam 25 fast with the side plates 16. The arrangement is such that the planar support 11 is on a level with the top surfaces of belt guide plates 29 and 30.

The cantilever arms 26 are formed with cutouts at maximum stress areas and strain gauges 27 are positioned in the cutouts. The strain gauges are connected by suitable temperature compensated bridge circuits to sum their outputs.

Figure 3:
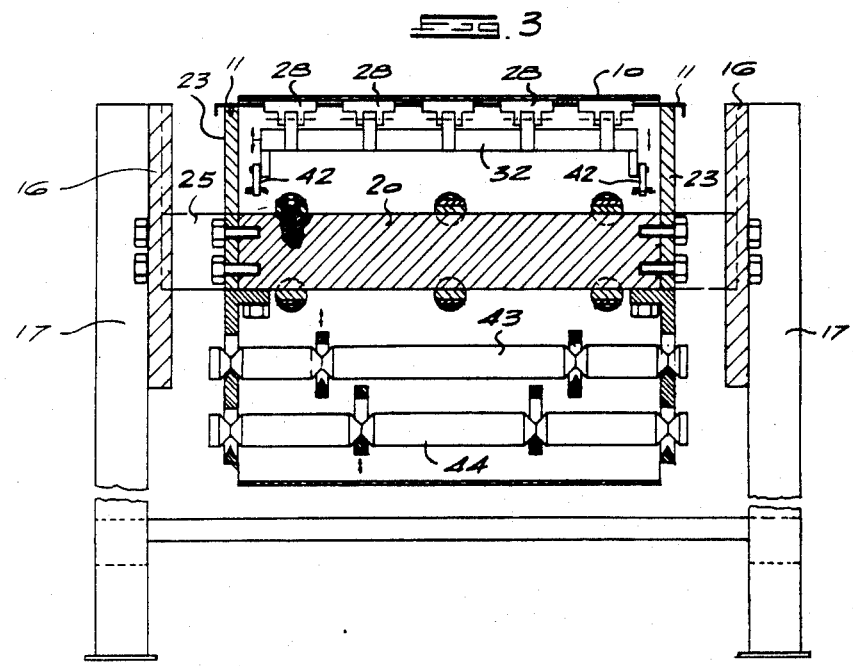
FIG. 3 is a section on the line 3—3 of FIG. 1.

The support 11 is formed with holes to allow lifting studs 28 to pass through and lift the belt 10 off the support 11 as shown in FIG. 3. The studs 28 are carried by a lifter plate 32 operated by a motor 38 through a crank 33, a push rod 39 and cranked levers 42. By causing the motor 38 to run in one direction the plate 32 is lifted and in the opposite direction the plate 32 is lowered.

In this case there are two calibration weights 43 and 44. They are independently controlled and operated by weight application motors 45 and 46 via crank handles 47 and 48. The weights 43 and 44 can be hung on to hangers 50 below the crossbeam 20 and with their axes in the vertical plane bisecting the crossbeam 20. In FIG. 3 the weight 43 is hung on the hangers 50 while the weight 44 is off the hangers 50.

It will be seen that strain gauge readings can be taken with the belt 10 resting on the support 11 and no weights on the hangers 50. At other times the belt can be lifted off the support 11 and readings taken without the weights and then with each weight separately and with both weights combined. The manner of processing such measurements is known.

What is important is that at all times the forces acting on the support 11 (belt or weights) act in the vertical plane represented by the line 3—3 in FIG. 1. With the belt 10 on the support 11 accurate readings are possible even if the load on the belt 10 is unevenly distributed.

I claim:

1. A weighbelt apparatus which has a belt upon which material is moved across the apparatus, a generally planar support for the belt extending across the apparatus, belt lifting means connected to the apparatus and arranged to lift the belt out of contact with the planar support during operation of the apparatus, and means to apply a known downward force to the planar support in order to calibrate the apparatus, with the improvement that the planar support is cantilevered to each side of a central crossbeam transverse to the direction of belt movement, the crossbeam is mounted on a plurality of cantilever arms cantilevered off fixed structure, strain gauges are mounted on the arms and the means to apply the known downward force acts on the lower end of the crossbeam in the vertical plane containing the longitudinal axis of the crossbeam.

2. The apparatus claimed in claim 1 in which the cantilever arms are formed with cutouts in which the strain gauges are positioned.

3. The apparatus claimed in either one of the above claims including more than one independent means to apply a known downward force to the lower end of the crossbeam.

* * * * *